Dec. 31, 1963     E. A. HENRY     3,115,771
METHOD AND APPARATUS FOR ULTRASONIC SHEARWAVE INSPECTION
Filed June 9, 1959     3 Sheets-Sheet 1

Dec. 31, 1963    E. A. HENRY    3,115,771
METHOD AND APPARATUS FOR ULTRASONIC SHEARWAVE INSPECTION
Filed June 9, 1959    3 Sheets-Sheet 2

United States Patent Office 3,115,771
Patented Dec. 31, 1963

3,115,771
METHOD AND APPARATUS FOR ULTRASONIC SHEARWAVE INSPECTION
Elliott A. Henry, Newtown, Conn., assignor to Branson Instruments, Inc., Stamford, Conn.
Filed June 9, 1959, Ser. No. 819,042
12 Claims. (Cl. 73—67.9)

This invention relates to improvements in pulsed ultrasonic materials inspection, and more particularly to a method and means of rapidly determining the location of internal flaws or discontinuities in solid bodies by improved shear wave or angle-beam inspection techniques. Apparatus for ultrasonic flaw detection is generally well known in the art, having been disclosed, for example, in expired U.S. Patent No. 2,280,226 granted April 21, 1942, to F. A. Firestone. Prior angle inspection techniques, as discussed for example in Carlin U.S. Patent 2,527,986, and, as generally well known to those skilled in the art, have been useful in detecting the presence of flaws but have not been completely effective in accurately and rapidly locating the position of hidden discontinuities. In general, these techniques comprise the introduction of a short train of high-frequecy vibrations into the part to be inspected, and timing the round-trip propagation time between the entrant surface and an internal reflecting discontinuity, such as an internal flaw.

Heretofore it has been the practice to apply a variable frequency square wave to one of the vertical deflection plates of the cathode ray tube indicator to identify increments of time as the cathode ray beam sweeps across the face of the tube. The frequency of the applied squarewave is made variable to accommodate a wide variety of materials having different velocities of wave propagation. This prior art method is described in U.S. Patent No. 2,448,363 granted to F. A. Firestone (et al.) on August 31, 1948. Such square wave time marks have been satisfactory where longitudinal vibrational waves are employed, such waves being propagated in a direction at right angles to the face of the piezoelectric transducer, and with this arrangement a unit of time (as indicated by the square wave time mark) corresponds to a unit of the lineal dimension of the part, and the distance between the entrant surface of the part and a reflecting discontinuity can be readily determined. However, when shear waves are employed, as is the practice for inspection of flat plates or weldments, the beam enters the part at an angle of approximately 45 degrees with respect to the surface of the part and propagates by internal deflections within the part (as shown in FIGURE 2) so that the unit linear dimensional relationship no longer exists.

By the present invention I provide a time base trace, or sweep, which is modulated with a pyramid wave, having equal and linear rise and decay times, whereby both the linear distance between the entrant point of the ultrasonic beam and the defect, and also the depth of the defect from either surface, can be readily ascertained. With the time mark generator of the invention, the baseline corresponds to the path of the ultrasonic beam, through the body being tested, and both the top and bottom surfaces of the part or body are identified at the points of deflection of the ultrasonic beam within the body.

Accordingly, it is an object of the present invention to provide improved method and apparatus for providing a visual display of the path of an ultrasonic shearwave through a test body, said display indicating the two dimensional position within the body of defects and discontinuities that reflect the ultrasonic shearwave.

Another object of the invention is to provide time marking method and apparatus for ultrasonic materials inspection wherein the waveshape of the time mark corresponds to the path of a transverse vibrational wavetrain through a part or body having relatively parallel opposing surfaces.

Other objects of the invention will in part be obvious and will in part appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawing in which.

As stated hereinabove, it is a general object of this invention to provide an improved method of locating internal defects or flaws, in a body or mechanical part having relatively parallel opposing surfaces, by detecting the reflections of transverse vibrational wave trains. In general, this objective is achieved in the present invention by employing a cathode ray tube display system in which the path of the baseline trace represents the path of an acoustic wave through such a test body under inspection. The invention includes apparatus for producing time marks having equal and linear periods of rise and decay whereby a substantially equilateral pyramidal wave form is imparted to the cathode ray baseline display. Echo signals produced by internal reflections of acoustic waves are then superimposed upon this pyramidal base to display the exact locations of the discontinuities causing such reflections.

Figure 1:
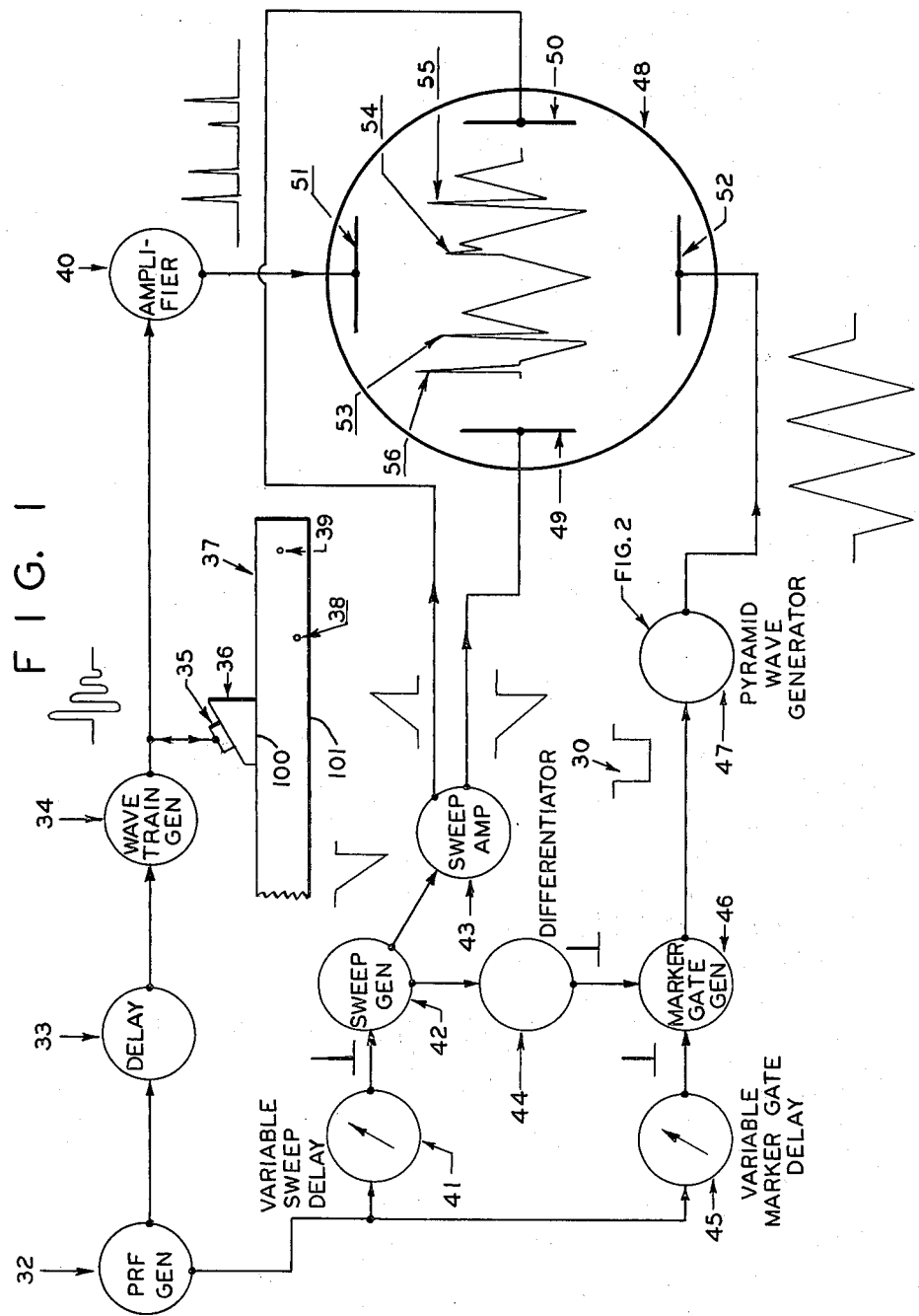
FIGURE 1 is a block diagram of a preferred embodiment of the invention.
Figure 2:
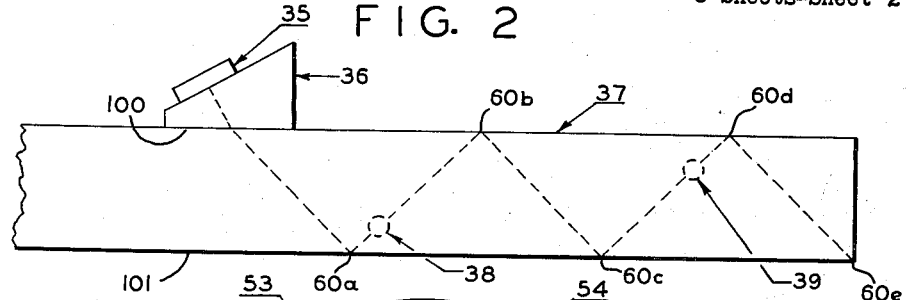
FIGURE 2 is a physical diagram illustrating the path of a transverse vibrational wave through a test specimen with parallel opposing surfaces.

Referring now in greater detail to FIGURE 1, there is shown a variable pulse repetition rate generator 32, commonly called a clock or synchronizer, which provides the timing signals for the system. These timing signals are coupled to three delay multivibrators, pulse delay 33, sweep delay 41 and marker gate delay 45. The pulse delay multivibrator 33 preferably provides a delay of 20 to 25 microseconds to permit the sweep generator 42 to be activated prior to the initial pulse, if desired. The delayed trigger from the pulse delay 33 is coupled to a wave train generator or pulser 34 which generates a highfrequency electrical wave train that is applied to a piezoelectric crystal 35. The piezoelectric crystal converts the electrical wave train into corresponding mechanical vibrations, and these longitudinal vibrations are transmitted through a plastic wedge 36 and through a suitable couplant such as oil or cement into a test body such as 37 (FIG. 1 and FIG. 2). The wedge 36 may preferably be of Lucite, although other plastic materials may be used. With a suitable wedge angle, which is approximately 32 degrees if the plastic wedge 36 is formed of Lucite, the longitudinal vibrations will be converted to transverse vibrations at the interface 100 between the Lucite wedge 36 and the entrant surface of the test body 37. Again a suitable couplant such as oil is required at the interface 100.

Referring now to FIGURE 2, in the test specimen 37, two defects or internal flaws are shown at 38 and 39. As is well known in the art, the transverse vibrational wave will propagate into the body 37 at an angle of approximately 45 degrees with respect to the entrant surface 100 as shown by the broken line 60 in FIGURE 2, and upon encountering the opposite boundary 101 of the body 37 will be deflected at the same angle of incidence, as shown at 60a in FIGURE 2. Any reflection from an internal discontinuity, such as flaw 38, lying in the path of the ultrasonic beam 60 will be reflected back over the same path to the piezoelectric crystal 35, through the wedge 36, and the transverse wave reflection will be converted to longitudinal vibrations at the interface 100 of the part 37 and the wedge 36. As illustrated in FIGURE 2, the broken line 60 represents the center line or axis of the beam of ultrasonic wave energy introduced into the test piece 37, and it is to be understood that this beam has a substantial cross-sectional area, which approximately corresponds to the active surface area of the piezoelectric transducer 35. Because the beam 60 is larger than the flaw 38, a substantial portion of the ultrasound passes around flaw 38 and is deflected from the upper surface boundary at 60b downward at an angle to the lower surface where it is again deflected upwardly at 60c. Between the deflection points 60c and 60d the beam encounters the second flaw 39 from which a portion of the energy is reflected back over the same path to the transducer 35.

The crystal transducer 35 converts the mechanical vibrations into electrical vibrations and these are in turn coupled to the echo amplifier 40 (FIGURE 1). The echo wave trains are amplified, converted into uni-directional impulses and further amplified in the amplifier 40 and then coupled to one of the vertical deflecting plates 51 of the cathode ray tube indicator 48, as shown in FIGURE 1.

Referring again to FIGURE 1, the cathode ray tube sweep is suitably initiated immediately prior to the arrival at the cathode ray tube 48 of the electrical signal developed in the transducer 35 in response to the incident wavetrain from the generator 34. This can readily be achieved by adjustment of the delay multivibrator 41 whose output trigger initiates the sweep generator 42 which generates a linear sawtooth of voltage. A negative going sawtooth is preferred, as will be explained hereafter. The sawtooth sweep voltage from generator 42 is amplified in a push pull amplifier 43 and applied to the horizontal deflecting plates 49 and 50 of the cathode ray tube 48.

The marker gate generator 46 may be a monostable multivibrator with the quasi-stable state adjusted for a period just slightly longer than the maximum period of the sweep generated by the sweep generator 42. This will insure the return of the marker gate generator 46 to the stable state prior to the subsequent initiating trigger from the delay multivibrator 45. The pyramid wave generator 47 is activated by the gate wave 30 and deactivated at the end of the sweep by a trigger derived from differentiation of the negative going sweep waveform by the differentiating network 44. This trigger restores the marker gate generator 46 to its stable state, terminating the gate signal. The pyramid wave is applied to the other vertical deflecting plate 52 of the cathode ray display tube 48. Thus the cathode ray beam of display tube 48 is deflected vertically, as viewed in FIGURE 1, by both the pyramid wave signal from generator 47 and by the amplified echo signals from amplifier 40, the latter being superimposed upon the former at time intervals corresponding to the acoustical propagation periods of ultrasound echos within the test body.

Thus, the sequence of events in the operation of the timing circuits of FIGURE 1 is initiated by a timing signal, from the generator 32, which energizes the delay multivibrators 33, 41 and 45.

The delay multivibrators 33 and 41 are adjusted to energize the sweep generator 42 before the generator 34 transmits a wave train to the crystal 35. Thus, the horizontal trace on the tube 48 starts before the wave train is developed, as indicated by the display on the tube 48 of the wave train pulse 56.

Since the wave train is delayed by the wedge 36 before impinging on the part 37, the initiation of the pyramid wave 31 can be delayed correspondingly with the delay multivibrator 45, which, after the selected delay, switches the generator 46 to its quasi-stable state to energize the generator 47 to develop the wave 31.

The trailing edge of each sweep signal from generator 42 is differentiated by the network 44 to develop a quench signal that returns the monostable generator 46 to the stable state. As mentioned above, the period of the quasi-stable state of generator 46 is preferably slightly longer than the sweep period of generator 42, so that the generator 46 continues to gate On the generator 47 until the sweep pulse ends. Further, if no quench signal is received, the generator 46 automatically returns to the stable state prior to receiving the next initiating signal from the multivibrator 45.

Figure 3:
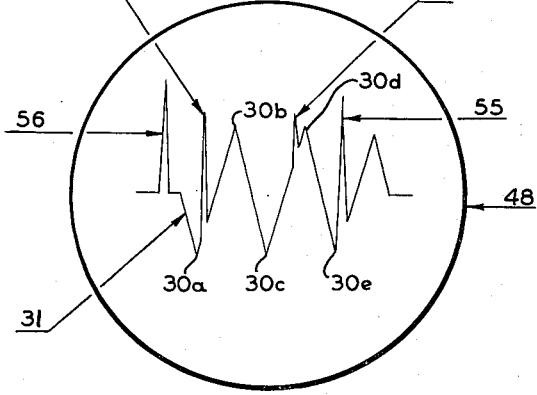
FIGURE 3 illustrates the pattern displayed on the face of a cathode ray tube with the test specimen of FIGURE 2 and the instrumentation represented in FIGURE 1.

The advantage of the pyramid wave marker is illustrated by comparing FIGURE 2, showing the ultrasonic beam path through a test piece 37 and internal flaws or defects 38 and 39, with FIGURE 3 which illustrates the corresponding pattern displayed on the face of the cathode ray tube 48. Referring in particular to FIGURE 3, the points 30a through 30e at which the display trace 31 changes direction, correspond respectively to the ultrasonic beam deflection points 60a through 60e in FIGURE 2. The initial pulse 56 precedes the first cycle of the pyramid wave 31 by an amount corresponding to the transit time through the wedge 36 (FIGURE 2) and the delay period is controlled by the delay multivibrator 45 (FIGURE 1). Echo signal 53 in FIGURE 3 corresponds to defect 38 in FIGURE 2, echo 54 to defect 39 and echo 55 to the bottom right hand corner of the test part 37. The relative positions of the echo signal displays 53 and 54 on the sloping portions of the pyramid wave trace 31 correspond to the locations of the internal flaws 38 and 39 in test piece 37, indicating both the distances of each flaw from the opposite parallel surfaces 100 and 101, as well as the longitudinal (or horizontal) separation between the flaws and their respective distances from the end of the test piece 37 which is shown by the display of echo signal 55. By decreasing the sweep speed, the cathode ray tube 48 is enabled to display in a small space signals corresponding to the travel path of ultrasonic waves through test bodies of very substantial length.

Accordingly, for inspecting a test piece 37 having a small thickness between the surfaces 100 and 101, the period of the pyramid wave will be shorter than when inspecting a test piece having a larger thickness between its opposed surfaces.

The pyramid wave generator 47 in FIGURE 1 will be described in detail hereinafter with particular reference to FIGURE 4 of the drawings. In general there are considerable data in the literature on the subject of pyramid waves, described as non-sinusoidal waves having equal and linear rise and decay times, being used as classical examples for wave analysis, but practically no data exist in the literature on the generation of such waveforms. In current practice, pyramid wave forms are approximated by integration of square waves, but such techniques can never produce linear rise and decay times; both rise and decay will always have an exponential form differing only in degree by the amount of integration, and if the integration is carried to a sufficient degree the resultant wave will be a sine wave having the fundamental frequency of the square wave. The integration technique for approximating pyramid waves suffers a further serious disadvantage where a wide range of frequencies are required, as the time constant of the integration network must be continually adjusted to correspond to the period of the wave, for a uniform approximation.

Figure 4:
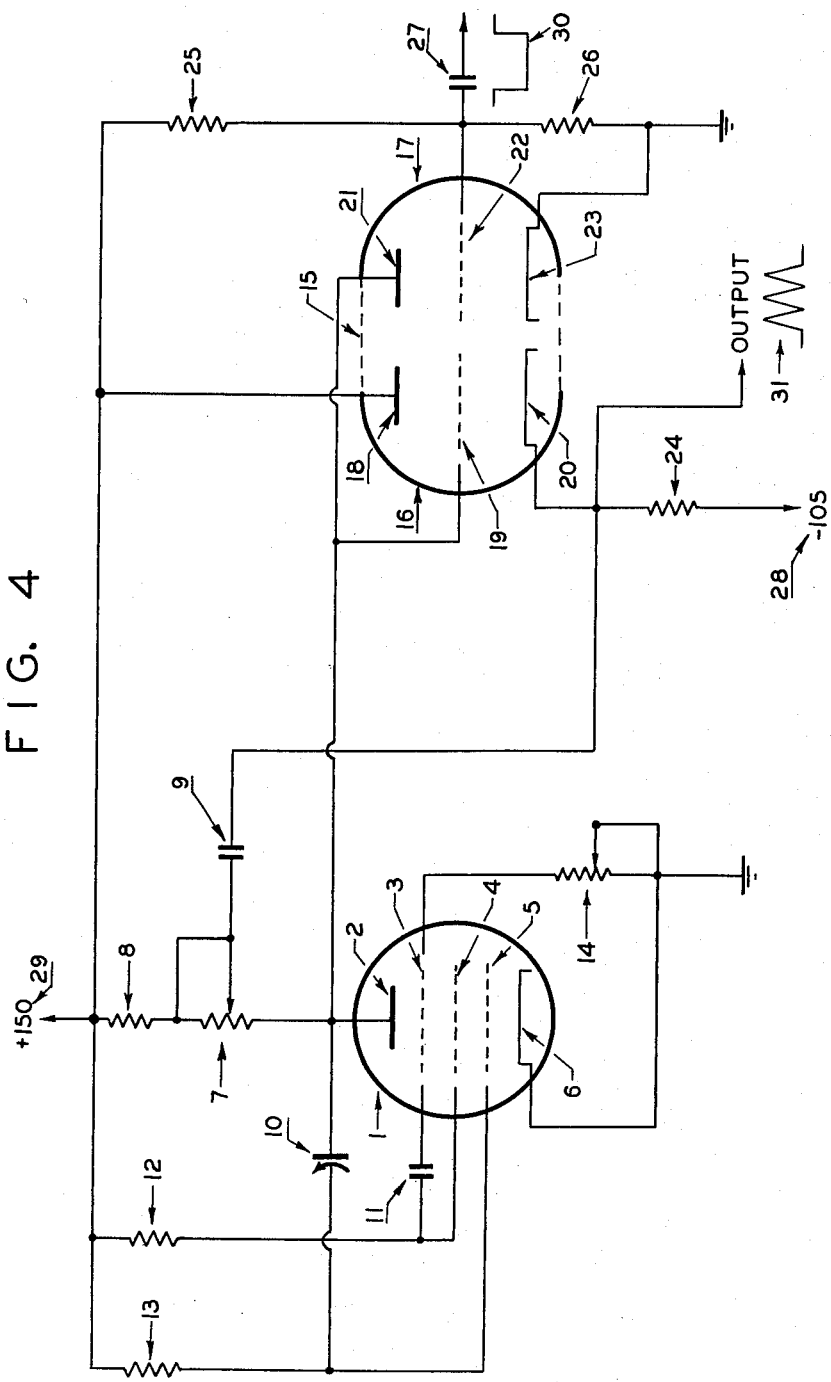
FIGURE 4 is a schematic wiring diagram of the gated pyramid wave generator of the invention; and, FIGURES 5, 6 and 7 illustrates important waveforms applied to and/or obtained from the gated pyramid wave generator of FIGURE 4.

FIGURE 4 is a schematic diagram of my gated pyramid wave generator which overcomes the above mentioned limitations of prior art. The generator of FIGURE 4 is characterized by equal and linear rise and decay times and operable over a wide frequency range (ten thousand or more to one). It will be evident to those skilled in the art that if tube 17 is deleted, the gated feature will be omitted and the generator of FIGURE 4 will produce continuous waves. Basically the circuit of FIGURE 4 may be described as a free running phantastron relaxation oscillator with a boot-strapped recharge of the timing capacitor 10 providing a linear rise in the plate voltage of tube 1 in place of the exponential rise normal to the basic circuit. Gating is accomplished by holding the potential at anode 2 of tube 1 at essentially ground potential in the quiescent period, making in addition the oscillator coherent for the quasi-stable state. Referring further to FIGURE 4, in the quiescent state the grid 22 of tube 17 is maintained at ground potential by the grid to cathode conduction between grid 22 and cathode 23, this grid 22 being normally at plus ten volts. The anode 21 of tube 17 is connected to the anode 2 of tube 1, and tube 17 is heavily conducting, maintaining both anodes at approximately plus five volts, which is insufficient to allow tube 1 and associated components to oscillate. At this time the screen grid 4 of tube 1 is conducting heavily thereby assisting in maintaining the low potential at anode 2. When the gate signal 30 arrives at grid 22, tube 17 is cut-off and the voltage at anode 2 of tube 1 begins to rise.

Still referring to FIGURE 4, the grid 19 of tube 16, which operates as a cathode follower, is directly connected to anode 2 of tube 1. As potential at cathode 20 of tube 16 rises, the rising voltage is coupled to the junction of resistors 7 and 8 through capacitor 9, thereby effectively increasing the supply potential to anode 2, thus producing a linear rate of rise of the anode potential on tube 1, and the recharge of capacitor 10. During this time of potential build-up the cathode current of tube 1 is diverted to the screen grid 4, until a critical anode voltage is attained. The critical anode voltage for tube 1 is established by the value of resistor 14 connected between the "number three" grid 3 and ground, the lower the magnitude of resistor 14 the lower the critical anode potential. At this critical voltage, anode 2 of tube 1 begins to draw current and the screen grid 4 current is reduced; the voltage at anode 2 then begins to fall and this potential drop is coupled to the control grid 5 through the timing capacitor 10. This 100% negative feedback coupling between anode 2 and control grid 5 produces a linear drop in the anode potential, and the rate of anode potential drop is proportional to the time constant of capacitor 10 and resistor 13.

When the voltage on anode 2 of tube 1 is within a few volts above ground potential (of the order of 3 to 5 volts), the anode current is then cut-off and the cathode current is transferred to the screen grid 4. The anode potential of tube 1 then begins to rise at a linear rate, a result of the bootstrapping previously described. The rate of rise is controlled by the time constant of capacitor 10 and resistor 7. It will be apparent that the anode supply potential to tube 1 will be constantly reduced during the negative run-down of the anode 2 potential by the bootstrapping action of tube 16 and associated components just as it is increased during the recharge period. This requires that resistor 13 have a greater magnitude than resistor 7, to equalize the rise and decay times of the potential on anode 2. The two periods may be readily equalized by providing an adjustable resistor as shown in FIGURE 4 for resistor 7. In practice it has been found that the valve of the anode resistor 7 will be approximately one half the value of the control grid resistor 13. Once the value of resistor 7 has been adjusted, the frequency may be varied by changing the value of capacitor 10 without altering the pyramid wave shape, as capacitor 10 is common to both networks controlling the rise and decay characteristics of the anode 2 potential.

The time constant of capacitor 11 and resistor 14 must be long with respect to the period of the gate wave to permit all cycles of the gated pyramid wave to have equal amplitude, and as resistor 14 is adjusted to control the critical anode 2 voltage and may have a low value, such as one thousand ohms, capacitor 11 must be large, for example ten microfarads.

Figure 5:
Figure 6:
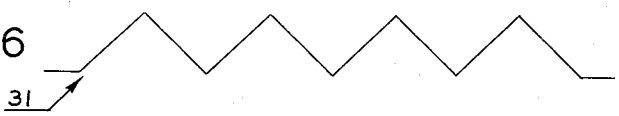
Figure 7:
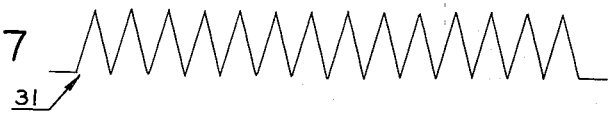

FIGURE 5 illustrates the gate wave form 30 which is applied to grid 22 through capacitor 27, in FIGURE 4. FIGURE 6 illustrates the gated pyramid output wave 31 from the cathode 20 of the cathode follower tube 16, at low frequency; and FIGURE 7 illustrates the form of pyramid wave output at a higher frequency. The low equivalent generator impedance of the cathode follower 16 provides the low output impedance and makes the amplitude of the output wave independent of the load impedance for any load between infinity and approximately 250 ohms.

It will thus be seen that the objects set forth above, among those made apparent from the preceding description, are efficiently attained and, since certain changes may be made in carrying out the above method and in the article set forth without departing from the scope of the invention, it is intended that all matter contained in the above description shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. In non-destructive materials testing, the method of locating hidden flaws in material discontinuities comprising the steps of
   A. generating a succession of ultrasonic energy waves,
   B. introducing said waves into the test body at an entry point and at an angle whereby the waves traverse the body through internal deflection from opposite surface boundaries thereof and are reflected back to the point of entry,
   C. detecting the reflected return waves at the point of entry,
   D. generating a substantially pyramidal wave corresponding to the traversal of said ultrasonic waves in the test body,
   E. adding the detected reflected waves to said substantially pyramidal wave to develop a combined wave, and
   F. displaying the amplitude of said combined wave along one display coordinate as a function of time charted along a second display coordinate
      (1) so that both the horizontal and vertical displacements of the display bear a dimensional correspondence to the physical path traversed by the ultrasonic energy within the test body.

2. In non-destructive materials testing, the method of locating defects in a test body having first and second sides substantially uniformly spaced apart, said method comprising the steps of
   A. generating an ultrasonic signal,
   B. introducing said signal into said test body to travel therein at an oblique angle to said sides,
   C. sensing the reflections of said ultrasonic signal from said test piece,
   D. developing an electrical echo signal responsive to the sensed reflection of said ultrasonic signal,
   E. generating a substantially pyramid wave having substantially equal and linear periods of rise and fall corresponding to and synchronized with the propagation time of said ultrasonic signal between said first and second sides, F. combining said echo signal with said pyramid wave, and G. displaying the resultant combined signal along one display coordinate as a function of time charted along a second display coordinate.

3. Apparatus for detecting and locating structural discontinuities comprising in combination
A. means for periodically generating ultrasonic waves,
B. means for
- (1) introducing said periodically generated ultrasonic waves into a body to be tested to travel therein along a first direction by reflection between opposed surfaces of the body that are spaced apart in a direction transverse to said first direction, and
- (2) detecting reflected ultrasonic waves, C. display means including a cathode ray indicator,
D. a sweep signal generator connected with said cathode ray indicator and adapted to produce repetitive ray deflections in a first direction,
E. a marker signal generator producing a marker wave corresponding to the path of said ultrasonic waves in the test body,
- (1) said marker signal generator being connected in circuit with said cathode ray indicator and
- (2) deflecting the indicator rays with said marker wave in a direction transverse to said first direction, and F. means for modulating the two-directionally deflected rays in accordance with the time and amplitude displacements of the detected ultrasonic wave reflections produced by said introducing and detecting means.

4. The combination defined in claim 3 in which said ultrasonic wave generating means include variable timing means controllable to select the periodic repetition rate of said generated ultrasonic waves to correspond to the travel time of said ultrasonic waves in the test body.

5. The combination of claim 3 in which said ultrasonic wave introducing and detecting means comprises a piezoelectric transducer in combination with an angular coupling member for transmitting said ultrasonic waves into a test body at a preselected angle, whereby said waves traverse the body longitudinally through internal deflection between opposite surface boundaries thereof, and for receiving ultrasonic echo reflections from within the test body.

6. The combination of claim 5 further comprising
A. means for varying the frequency of said marker signal generator, and
B. means for varying the speed of said cathode ray sweep,
C. thereby to
- (1) display ultrasonic reflections from different length sections of a test body, and
- (2) conform the wave shape of the marker signal to the path of the ultrasonic waves in test bodies of different thickness.

7. Apparatus for testing solid materials to locate defects therein, said apparatus comprising in combination
A. means for periodically generating ultrasonic waves,
B. means for
- (1) introducing said periodically generated ultrasonic waves into a body to be tested and at an angle to a surface thereof for travel therein along a first direction by reflection between opposed surfaces of the body that are spaced apart in a direction transverse to said first direction and
- (2) detecting reflected ultrasonic waves during intervals when said generating means is inactive, C. a generator of pyramid time marker waves corresponding to the traversal of said ultrasonic waves in the test body, D. means for
- (1) superimposing said detected reflected waves on said pyramid time marker wave and
- (2) displaying said superimposed waves along one display coordinate as a function of time charted along a second display coordinate
  - (a) whereby said displayed superimposed wave indicates the two-dimensional locations of defects in the test body.

8. Ultrasonic echo signal display means comprising in combination
A. a transducer for
- (1) applying inspection signals to a body being tested to travel along a first direction in the test body by reflection between opposed surfaces spaced apart in a direction transverse to said first direction and
- (2) generating echo signals responsive to reflections of said inspection signals, B. an electrical marker wave generator producing output waves corresponding to the travel path of said inspection waves in the test body,
C. a gate wave generator supplying repetitive gating signals for activating and deactivating said marker wave generator at predetermined times.
D. a pulse repetition frequency generator connected in circuit with said marker wave and gate wave generators, and
- (1) synchronizing the gating operation of said gate wave generator with the signal applying operation of said transducer, E. means for varying the frequency of said pulse repetition frequency generator, and
F. display means
- (1) connected in circuit with said transducer and said marker signal generator, and
- (2) displaying the combined instantaneous value of said echo signals and said marker waves along a first axis as a function of time charted along a second axis orthogonal to said first axis.

9. In non-destructive ultrasonic materials inspection, the method of locating discontinuities comprising the steps of
A. producing an electrical echo signal corresponding to the reflections of ultrasonic waves travelling along a first direction in a test body by reflection between opposed surfaces of the body spaced apart in a direction transverse to said first direction,
B. producing an electrical time mark signal whose wave shape corresponds to the incident path of said ultrasonic waves to which said echo signal corresponds,
C. combining said echo signal and said time mark signal, and
D. displaying the resultant of said combined signals along one display coordinate as a function of time chartered along a second display coordinate.

10. In a cathode ray display of detected reflected ultrasonic signals, the method of simulating the travel path of ultrasonic shearwaves propagating along a first direction in a test piece by reflection between opposed surfaces spaced apart along a second direction substantially transverse to said first direction, said method comprising the steps of
A. generating a time marker signal having alternate and substantially equilateral periods of substantially linear rise and fall,
- (1) the period of said marker signal coinciding with twice the propagation time of said ultrasonic shearwave between opposed surfaces of the test piece, B. developing a second signal modulated in amplitude to correspond with detected ultrasonic signals reflected from ultrasonic shearwaves propagating through the test piece, C. applying said time marker signal and said second signal to vertical deflection electrodes of a cathode ray tube, and
D. applying a saw tooth sweep voltage to the horizontal deflection electrodes of said cathode ray tube,
   (1) said saw tooth sweep voltage being applied at least as early as the application of said time marker signal,
   (2) whereby the instantaneous sum of said time marker signal plus said second signal is displayed along a first coordinate as a function of time charted along a second display coordinate.

11. Apparatus for non-destructive materials testing comprising in combination
A. a timing signal source,
B. an electrical ultrasonic signal generator
   (1) connected in circuit with said source and
   (2) producing a transducer-exciting signal in response to receipt of a timing signal,
C. an electromechanical transducer connected in circuit with said ultrasonic signal generator for introducing ultrasonic waves to travel in a test body along a first direction by reflections between opposed surfaces of the body spaced apart transverse to said first direction,
   (1) said transducer developing electrical echo signals in response to ultrasonic echo waves it receives from the test body,
D. a time base generator connected in circuit with said timing signal source and
   (1) developing in response to a timing signal an electrical time base voltage,
E. a marker wave generator connected in circuit with said timing signal source for producing a marker wave corresponding to the travel path of said ultrasonic waves in the test body,
F. display apparatus for displaying the magnitude of an electrical signal along a first axis as a function of time chartered along a second axis,
   (1) said display apparatus being connected in circuit with said transducer, said time base generator and said marker wave generator, and
   (2) displaying the amplitude of the sum of said marker wave and said echo signals along said first axis
   (3) said display apparatus charting time along said second axis in response to the time base voltage received from said time base generator, and
G. a delay system
   (1) connected to receive the timing signals developed by said timing signal source and further connected to deliver said timing signals to said ultrasonic signal generator, to said time base generator, and to said marker wave generator,
   (2) comprising a first delay means having an independently adjustable delay to cause said time base generator to apply said time base voltage to said display apparatus prior to receipt of echo signals from said transducer at said apparatus, and
   (3) comprising a second delay means having an independently adjustable delay to synchronize said marker wave with the travel of said ultrasonic waves in the test body.

12. The combination defined in claim 11 in which
A. said time base generator is adjustable so that the period of the time base voltage can be adjusted to be slightly longer than the time required for echo signals to be received by said transducer from that portion of the test body being inspected, and
B. said marker wave generator is adjustable to adjust the period of the marker wave to coincide with the time required for the ultrasonic signals to travel from a first surface of the test body to an opposed surface and return to the first surface.

References Cited in the file of this patent
UNITED STATES PATENTS

| | | |
|---|---|---|
| 2,443,922 | Moore | June 22, 1948 |
| 2,458,771 | Firestone | Jan. 11, 1949 |
| 2,527,986 | Carlin | Oct. 31, 1950 |
| 2,740,289 | Van Valkenburg et al. | Apr. 3, 1956 |
| 2,773,255 | Meier et al. | Dec. 4, 1956 |
| 2,826,694 | Ropiequet | Mar. 11, 1958 |
| 2,839,916 | Van Valkenburg et al. | June 24, 1958 |
| 2,846,875 | Grabendorfer | Aug. 12, 1958 |

UNITED STATES PATENT OFFICE
CERTIFICATE OF CORRECTION

Patent No. 3,115,771                      December 31, 1963

Elliott A. Henry

It is hereby certified that error appears in the above numbered patent requiring correction and that the said Letters Patent should read as corrected below.

Column 2, line 26, for "FIGURES" read -- FIGURE --; column 4, line 50, after "length." insert the following:

> More specifically, with the preferred operation of the present ultrasonic display apparatus, the period of the sweep signal from the sweep generator 42 is adjusted to be slightly longer than the time required for echo signals to be received by the transducer 35 from that portion of the test piece 37 that it is desired to inspect. With this adjustment of the sweep signal period, all echo signals developed within the selected portion of the test piece will be displayed on the cathode ray display.
>
> The period of the pyramid wave, or marker, from the pyramid wave generator 47 is adjusted to coincide with the time required for the ultrasonic signals to propagate from a first surface, such as the surface 100, of the test piece 37 to an opposed surface, such as surface 101, and to return to the first surface.

column 8, line 57, and column 9, line 39, for "chartered", each occurrence, read -- charted --.

Signed and sealed this 2nd day of June 1964.

(SEAL)
Attest:

ERNEST W. SWIDER
Attesting Officer

EDWARD J. BRENNER
Commissioner of Patents